US012650963B1

(12) United States Patent
Ritter et al.

(10) Patent No.: US 12,650,963 B1
(45) Date of Patent: Jun. 9, 2026

(54) TABLE CHECKSUM IN DATABASE MANAGEMENT SYSTEMS

(71) Applicant: INTERNATIONAL BUSINESS MACHINES CORPORATION, Armonk, NY (US)

(72) Inventors: Thomas Ritter, Herrenberg (DE); Joachim Rese, Hockenheim (DE); Peter BP Becker, Lindenfels (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/008,976

(22) Filed: Jan. 3, 2025

(51) Int. Cl.
| | |
|---|---|
| *G06F 16/00* | (2019.01) |
| *G06F 16/215* | (2019.01) |
| *G06F 16/22* | (2019.01) |
| *H04L 12/14* | (2006.01) |

(52) U.S. Cl.
CPC ........ G06F 16/215 (2019.01); G06F 16/2282 (2019.01); H04L 12/1403 (2013.01)

(58) Field of Classification Search
None
See application file for complete search history.

(56) References Cited

U.S. PATENT DOCUMENTS

| | | | |
|---|---|---|---|
| 7,453,874 B1 | 11/2008 | Nguyen | |
| 9,471,302 B1 * | 10/2016 | Celi | ........................ G06F 11/36 |

| | | | |
|---|---|---|---|
| 11,386,235 B1 | 7/2022 | Bogacz | |
| 2008/0189498 A1 * | 8/2008 | Brown | ................ G06F 11/2097 |
| | | | 711/162 |
| 2016/0275150 A1 | 9/2016 | Bournonnais et al. | |
| 2018/0373585 A1 | 12/2018 | Yu | |
| 2022/0004664 A1 | 1/2022 | Burgupalli et al. | |

OTHER PUBLICATIONS

MySQL, "15.7.3.3 Checksum Table Statement", retrieved from web https://dev.mysql.com/doc/refman/8.0/en/checksum-table.html, dated Feb. 28, 2025, 1 page.
Lasa et al., "What are the best practices for using checksums to monitor data integrity in data engineering?", Linkedin, https://www.linkedin.com/advice/0/what-best-practices-using-checksums-monitor-data-p2e7f, dated Feb. 28, 2025, 7 pages.
Theresa C. Maxino, "The Effectiveness of Checksums for Embedded Networks", Carnegie Mellon University, retrieved from web https://users.ece.cmu.edu/~koopman/thesis/maxino_ms.pdf, dated May 2006, 32 pages.

* cited by examiner

*Primary Examiner* — Bai D Vu
(74) *Attorney, Agent, or Firm* — Stosch Sabo

(57) ABSTRACT

Described are techniques for Database Management System (DBMS) table checksums. The techniques include generating a first checksum of a record in a user table. The techniques further include storing an updated checksum in an entry corresponding to the user table in a DBMS catalog table, where the updated checksum is based on the first checksum and an initial checksum in the entry corresponding to the user table in the DBMS catalog table. The techniques further include verifying a data integrity of a transferred copy of the user table using the updated checksum in the entry corresponding to the user table in the DBMS catalog table.

20 Claims, 14 Drawing Sheets

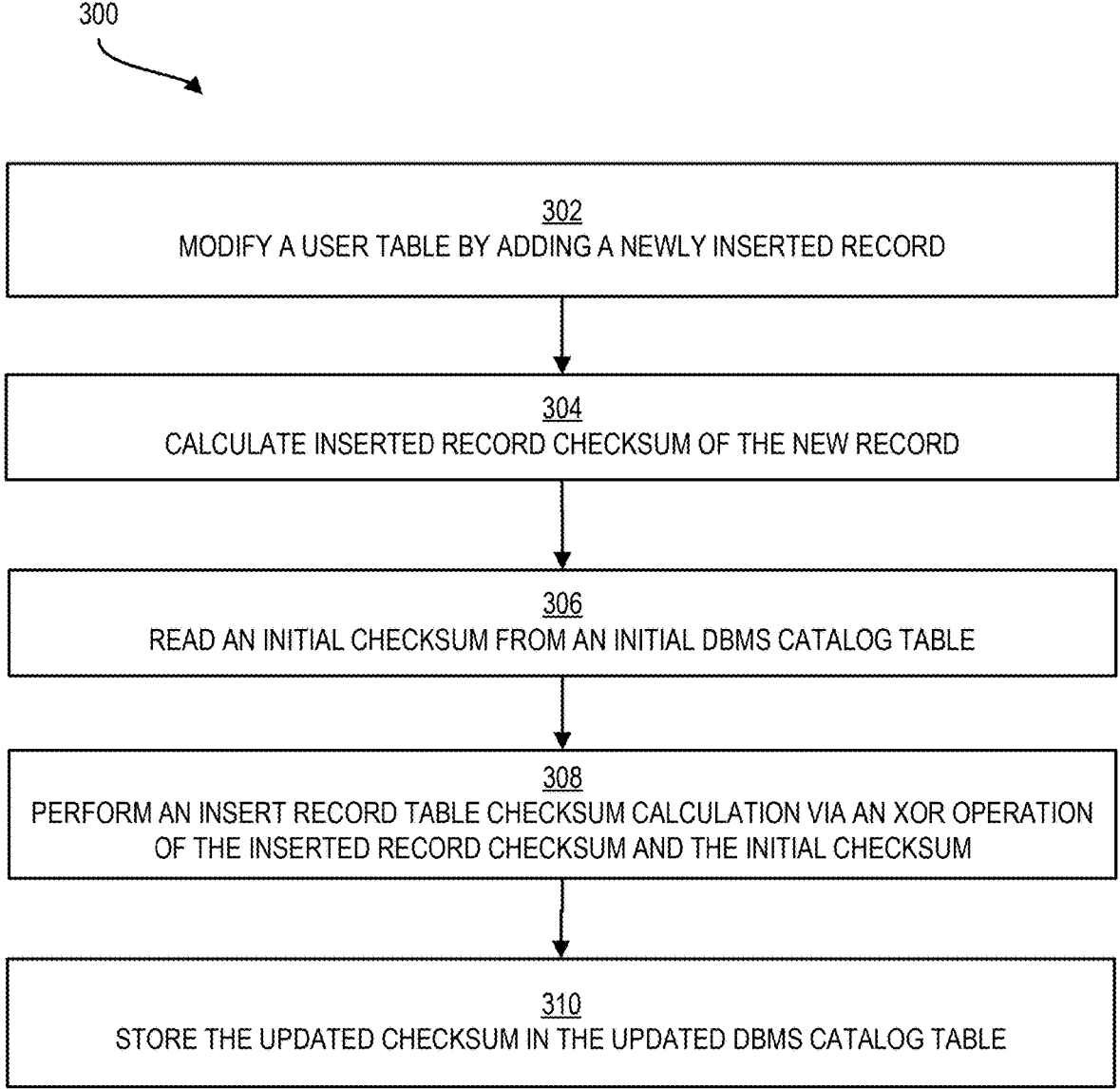

300

302
MODIFY A USER TABLE BY ADDING A NEWLY INSERTED RECORD

304
CALCULATE INSERTED RECORD CHECKSUM OF THE NEW RECORD

306
READ AN INITIAL CHECKSUM FROM AN INITIAL DBMS CATALOG TABLE

308
PERFORM AN INSERT RECORD TABLE CHECKSUM CALCULATION VIA AN XOR OPERATION OF THE INSERTED RECORD CHECKSUM AND THE INITIAL CHECKSUM

310
STORE THE UPDATED CHECKSUM IN THE UPDATED DBMS CATALOG TABLE

FIG. 3

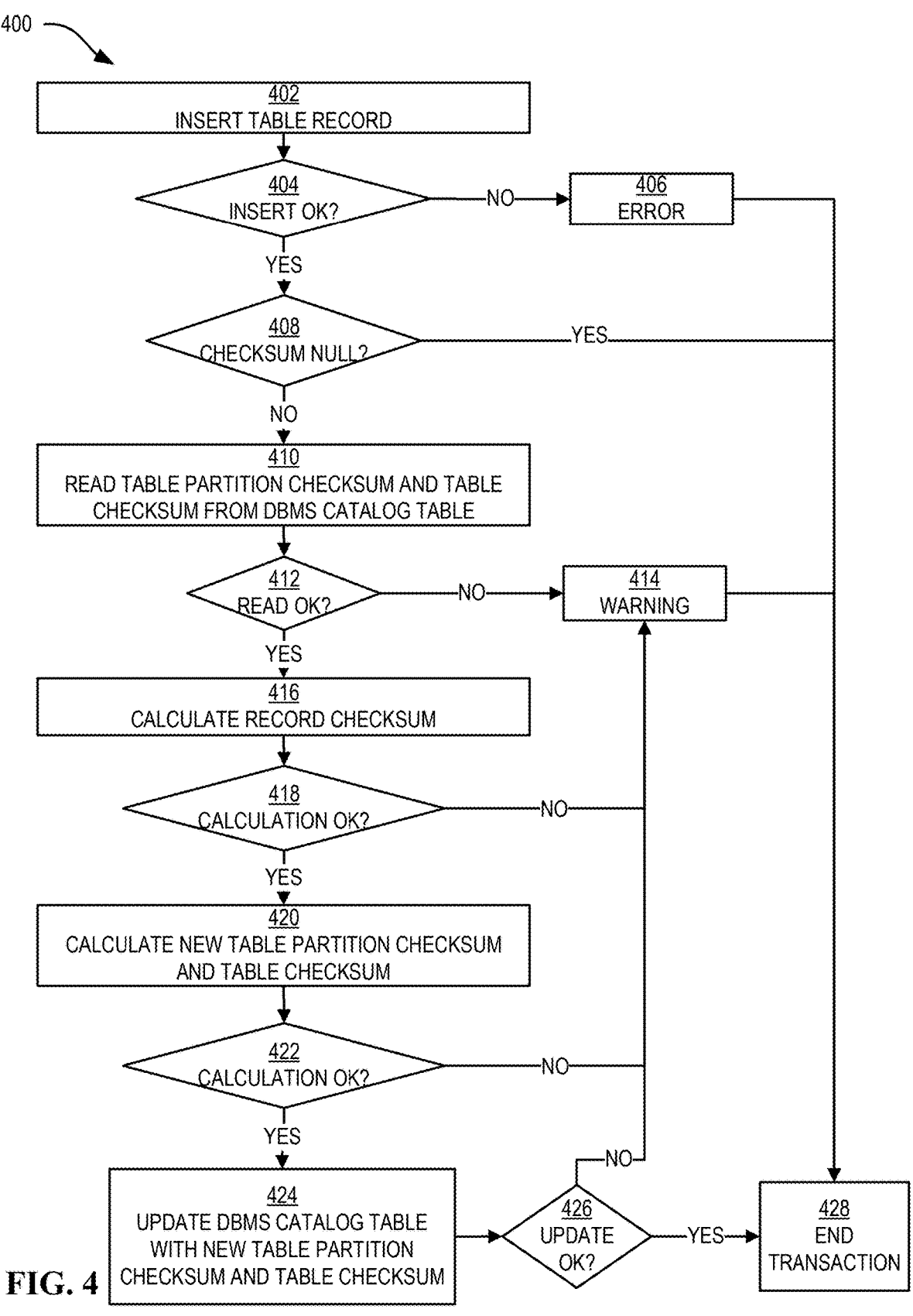

402
INSERT TABLE RECORD

404
INSERT OK?  —NO→  406
ERROR

YES

408
CHECKSUM NULL?  —YES→

NO

410
READ TABLE PARTITION CHECKSUM AND TABLE
CHECKSUM FROM DBMS CATALOG TABLE

412
READ OK?  —NO→  414
WARNING

YES

416
CALCULATE RECORD CHECKSUM

418
CALCULATION OK?  —NO→

YES

420
CALCULATE NEW TABLE PARTITION CHECKSUM
AND TABLE CHECKSUM

422
CALCULATION OK?  —NO→

YES

424
UPDATE DBMS CATALOG TABLE
WITH NEW TABLE PARTITION
CHECKSUM AND TABLE CHECKSUM

426
UPDATE
OK?  —NO
—YES→

428
END
TRANSACTION

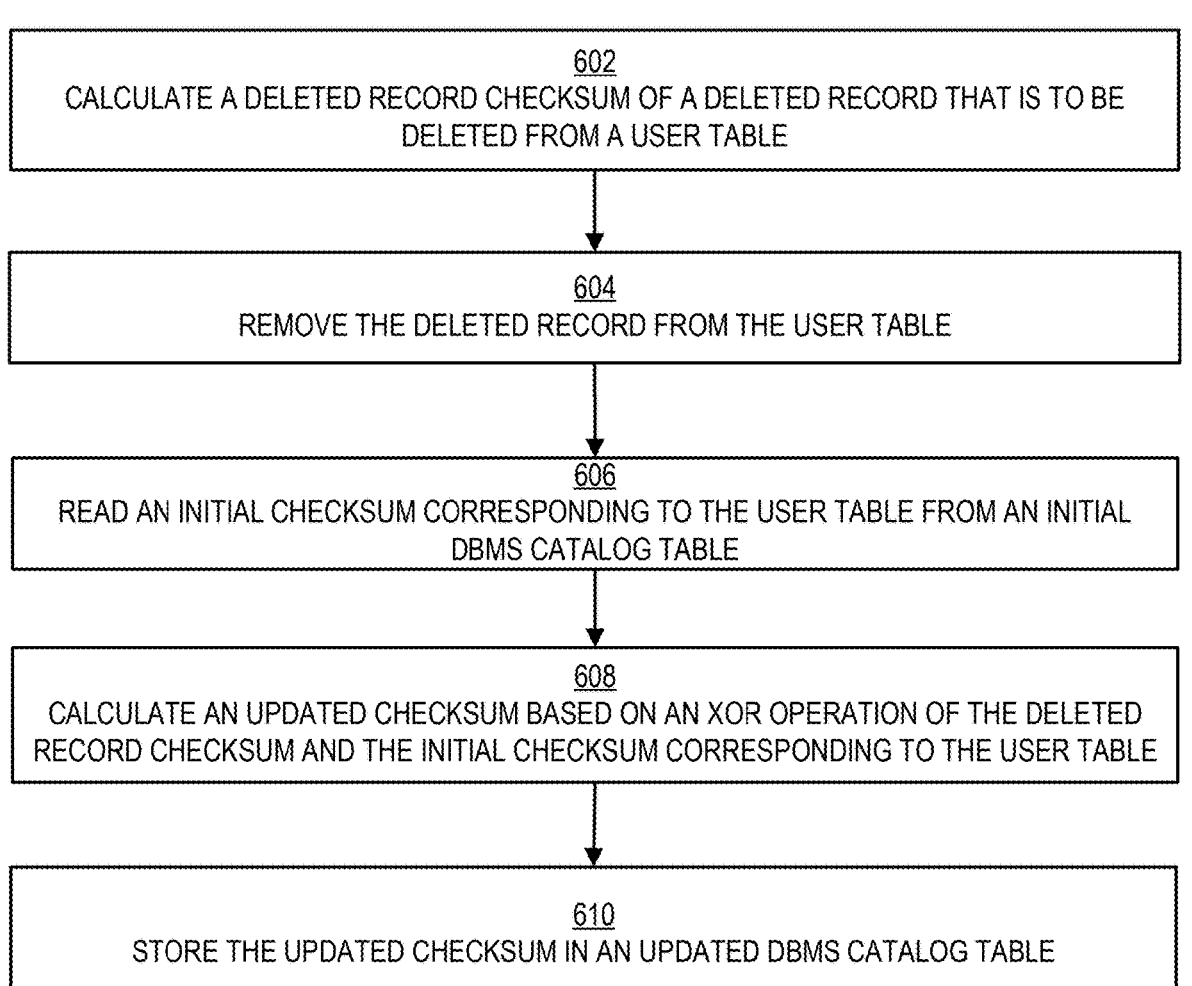

602
CALCULATE A DELETED RECORD CHECKSUM OF A DELETED RECORD THAT IS TO BE DELETED FROM A USER TABLE

604
REMOVE THE DELETED RECORD FROM THE USER TABLE

606
READ AN INITIAL CHECKSUM CORRESPONDING TO THE USER TABLE FROM AN INITIAL DBMS CATALOG TABLE

608
CALCULATE AN UPDATED CHECKSUM BASED ON AN XOR OPERATION OF THE DELETED RECORD CHECKSUM AND THE INITIAL CHECKSUM CORRESPONDING TO THE USER TABLE

610
STORE THE UPDATED CHECKSUM IN AN UPDATED DBMS CATALOG TABLE

FIG. 6

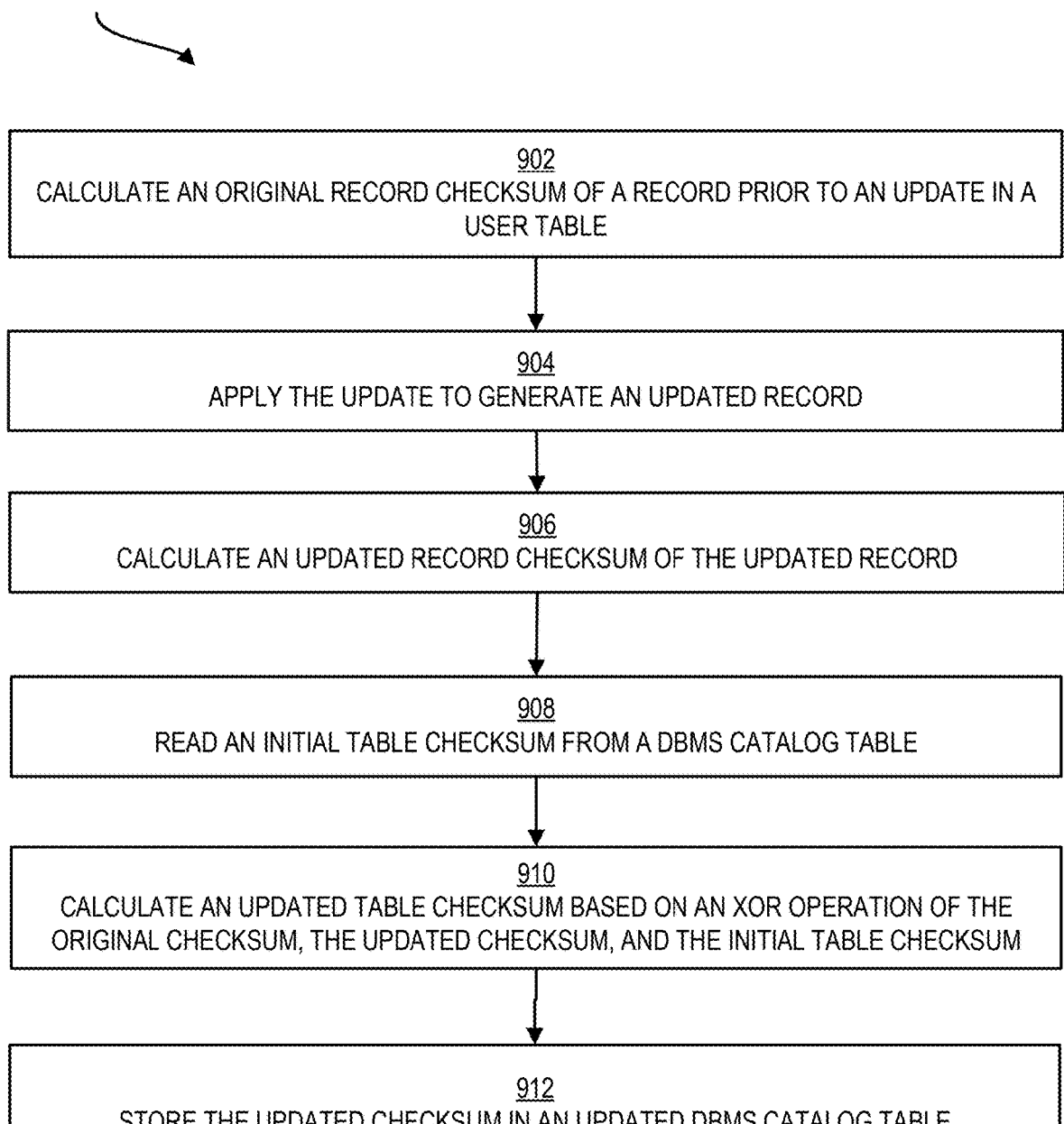

900

<u>902</u>
CALCULATE AN ORIGINAL RECORD CHECKSUM OF A RECORD PRIOR TO AN UPDATE IN A USER TABLE

<u>904</u>
APPLY THE UPDATE TO GENERATE AN UPDATED RECORD

<u>906</u>
CALCULATE AN UPDATED RECORD CHECKSUM OF THE UPDATED RECORD

<u>908</u>
READ AN INITIAL TABLE CHECKSUM FROM A DBMS CATALOG TABLE

<u>910</u>
CALCULATE AN UPDATED TABLE CHECKSUM BASED ON AN XOR OPERATION OF THE ORIGINAL CHECKSUM, THE UPDATED CHECKSUM, AND THE INITIAL TABLE CHECKSUM

<u>912</u>
STORE THE UPDATED CHECKSUM IN AN UPDATED DBMS CATALOG TABLE

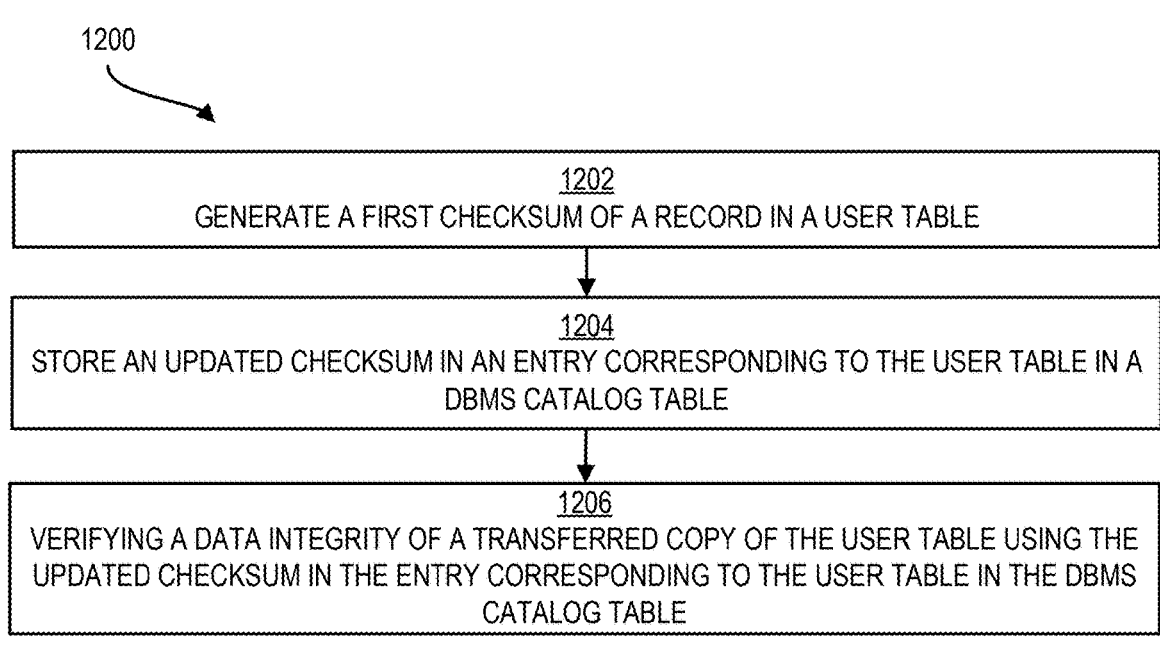

1202
GENERATE A FIRST CHECKSUM OF A RECORD IN A USER TABLE

1204
STORE AN UPDATED CHECKSUM IN AN ENTRY CORRESPONDING TO THE USER TABLE IN A DBMS CATALOG TABLE

1206
VERIFYING A DATA INTEGRITY OF A TRANSFERRED COPY OF THE USER TABLE USING THE UPDATED CHECKSUM IN THE ENTRY CORRESPONDING TO THE USER TABLE IN THE DBMS CATALOG TABLE

1212
TRANSFER A USER TABLE FROM A FIRST REPOSITORY TO A SECOND REPOSITORY

1214
CALCULATE A TABLE CHECKSUM ON THE USER TABLE IN THE SECOND REPOSITORY

1216
CHECKSUMS EQUAL?

—NO—                                              —YES—

1218
GENERATE AN INDICATION OF DATA CORRUPTION

1220
GENERATE AN INDICATION OF DATA INTEGRITY

FIG. 12B

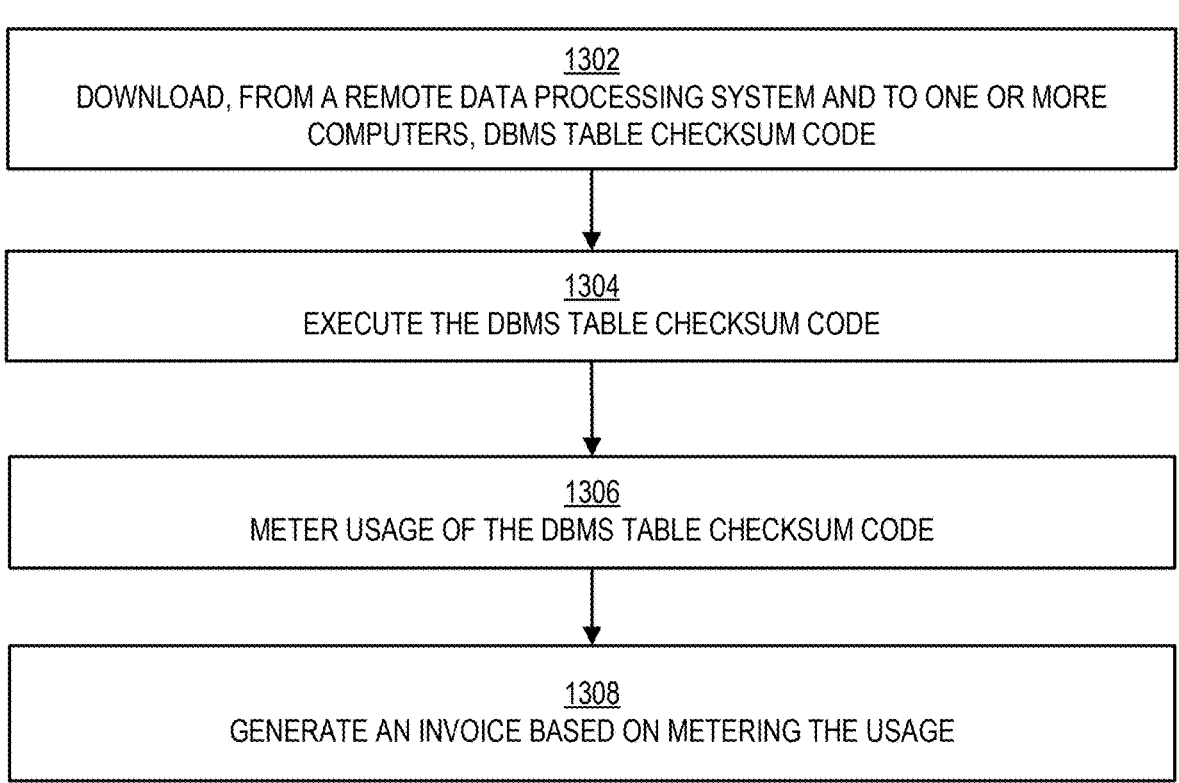
1302
DOWNLOAD, FROM A REMOTE DATA PROCESSING SYSTEM AND TO ONE OR MORE COMPUTERS, DBMS TABLE CHECKSUM CODE
1304
EXECUTE THE DBMS TABLE CHECKSUM CODE
1306
METER USAGE OF THE DBMS TABLE CHECKSUM CODE
1308
GENERATE AN INVOICE BASED ON METERING THE USAGE
FIG. 13

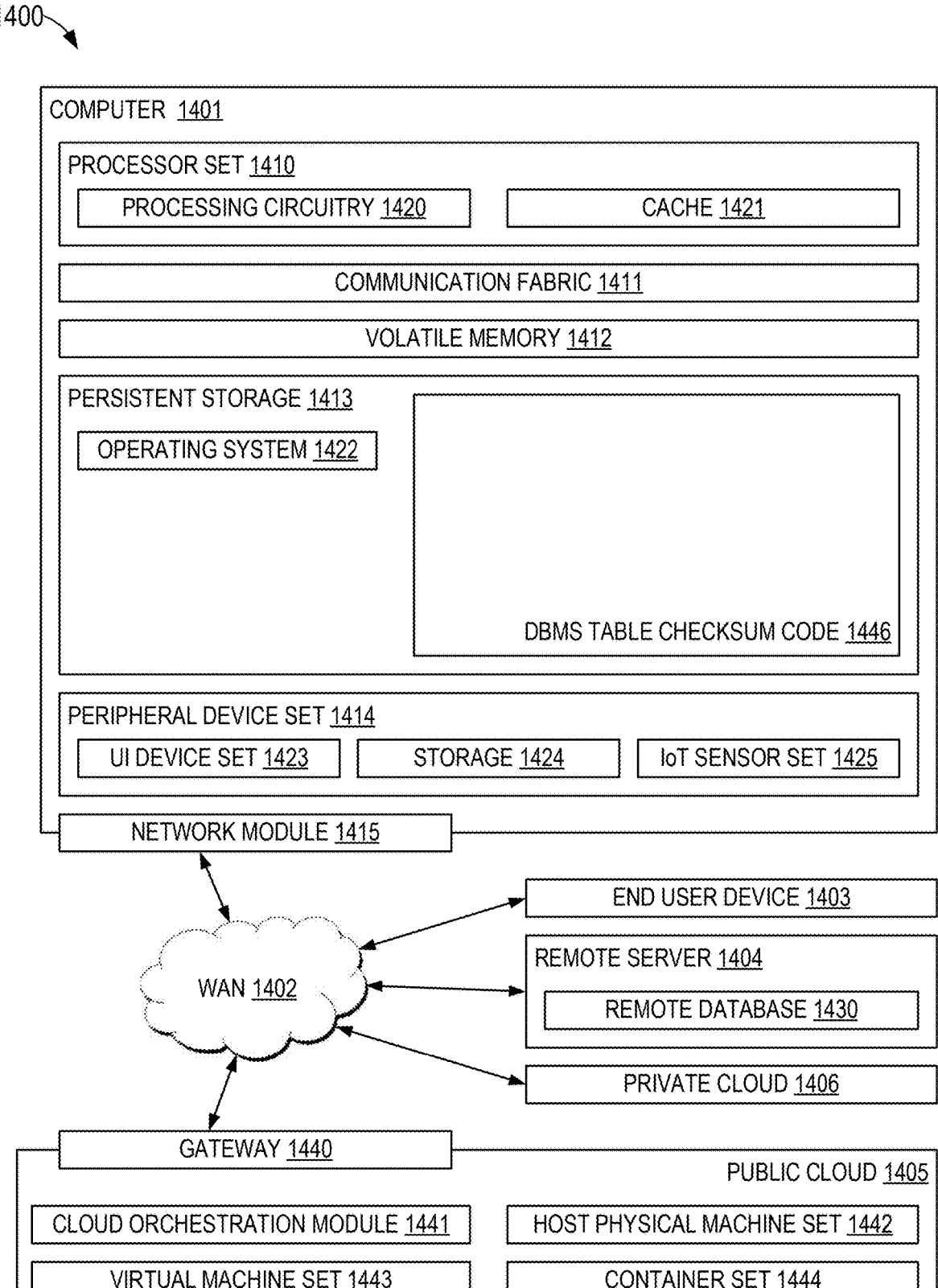

1400

COMPUTER 1401

PROCESSOR SET 1410

PROCESSING CIRCUITRY 1420          CACHE 1421

COMMUNICATION FABRIC 1411

VOLATILE MEMORY 1412

PERSISTENT STORAGE 1413

OPERATING SYSTEM 1422

DBMS TABLE CHECKSUM CODE 1446

PERIPHERAL DEVICE SET 1414

UI DEVICE SET 1423     STORAGE 1424     IoT SENSOR SET 1425

NETWORK MODULE 1415

WAN 1402

END USER DEVICE 1403

REMOTE SERVER 1404

REMOTE DATABASE 1430

PRIVATE CLOUD 1406

GATEWAY 1440

PUBLIC CLOUD 1405

CLOUD ORCHESTRATION MODULE 1441     HOST PHYSICAL MACHINE SET 1442

VIRTUAL MACHINE SET 1443          CONTAINER SET 1444

FIG. 14

TABLE CHECKSUM IN DATABASE MANAGEMENT SYSTEMS

BACKGROUND

The present disclosure relates to databases, and, more specifically, to database management systems (DBMS).

A DBMS is a software system configured to create one or more new databases and/or manage one or more existing databases. A DBMS enables system administrators and/or users to create, protect, read, update, and/or delete data in one or more associated databases. A DBMS can also be configured to manage security, data integrity, and/or concurrency for the one or more associated databases.

SUMMARY

In some aspects, the techniques described herein relate to a computer-implemented method comprising generating a first checksum of a record in a user table. The method further comprises storing an updated checksum in an entry corresponding to the user table in a DBMS catalog table, where the updated checksum is based on the first checksum and an initial checksum in the entry corresponding to the user table in the DBMS catalog table. The method further comprises verifying a data integrity of a transferred copy of the user table using the updated checksum in the entry corresponding to the user table in the DBMS catalog table.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 3 illustrates a flowchart of an example method for an insert record workflow, in accordance with some embodiments of the present disclosure.

FIG. 4 illustrates a flowchart of a more detailed example method for an insert record workflow, in accordance with some embodiments of the present disclosure.

FIG. 6 illustrates a flowchart of an example method for a delete record workflow, in accordance with some embodiments of the present disclosure.

FIG. 9 illustrates a flowchart of an example method for an update record workflow, in accordance with some embodiments of the present disclosure.

FIG. 12A illustrates a flowchart of an example method for DBMS table checksum management, in accordance with some embodiments of the present disclosure.

FIG. 12B illustrates a flowchart of an example method for verifying data integrity using DBMS table checksum management, in accordance with some embodiments of the present disclosure.

FIG. 13 illustrates a flowchart of an example method for downloading, deploying, metering usage, and invoicing DBMS table checksum code, in accordance with some embodiments of the present disclosure.

FIG. 14 illustrates a block diagram of an example computing environment, in accordance with some embodiments of the present disclosure.

Figure 1:
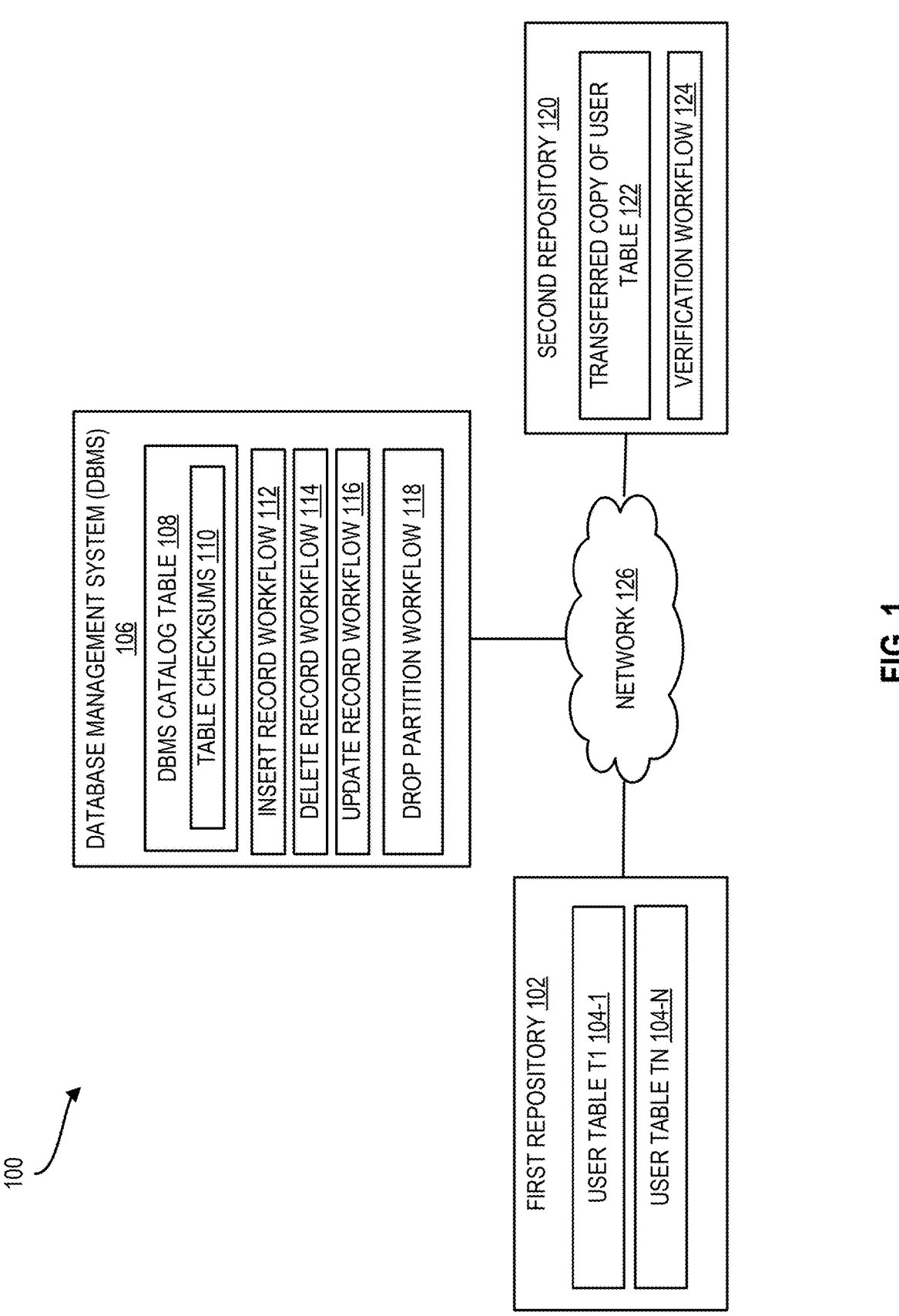
FIG. 1 illustrates a block diagram of an example system for DBMS table checksum management, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward databases, and, more specifically, to database management systems (DBMS). While not limited to such applications, embodiments of the present disclosure may be better understood in light of the aforementioned context.

Database administrators require the ability to determine whether transferred data on a target system matches the data on the source system (data integrity) and/or whether the data in a table has changed (data consistency). Aspects of the present disclosure enable database administrators to verify data integrity and/or data consistency by calculating the checksum of the content of the entire table and comparing the calculated checksum with a previous value. However, checksum calculations become computationally expensive (e.g., runtime, resources, etc.) for relatively larger tables (e.g., tables including millions or billions of records). Aspects of the present disclosure overcome the computationally expensive nature of traditional checksum techniques applied to databases.

Aspects of the present disclosure overcome the aforementioned challenge by utilizing one or more DBMS catalog tables storing table checksums, where the table checksums are updated using Exclusive OR (XOR) operations of an initial table record, an inserted record, a deleted record, and/or an updated record. In some embodiments, aspects of the present disclosure can integrate the table checksum calculation into the Data Manipulation Language (DML) transaction workflow of a DBMS. Additionally, aspects of the present disclosure can utilize one or more DBMS catalog tables to store, retrieve, and/or utilize the calculated checksums. Aspects of the present disclosure can be performed in real-time, based on user selection, or at predetermined intervals. Additionally, aspects of the present disclosure can be applied to entire tables and/or to table partitions.

Various features of the table checksums proposed in the present disclosure will now be described in more detail. The checksum calculation can be performed on entire tables, table partitions, or both. Checksums can be stored in corresponding DBMS catalog tables containing relevant details about the user tables. The DBMS catalog tables can utilize a new column CHECKSUM (e.g., type char, with support for NULL values) where the number of stored characters can depend on a hashing algorithm for calculating hash values of table records (e.g., 16 characters when the Message Digest 5 (MD5) algorithm is used for the checksum calculation). DML workflows can be extended to support the table checksum calculation.

Additionally, the Data Definition Language (DDL) for CREATE TABLE and ALTER TABLE statements can be extended to include a CHECKSUM option. In some embodiments, if no checksum calculation is enabled, the value to be stored in the CHECKSUM column of these DBMS catalog tables is a NULL value. In some embodiments, if the checksum calculation is enabled via ALTER TABLE and the table is empty, the initial value in the CHECKSUM column of the DBMS catalog table is 0. In some embodiments, if the checksum calculation is enabled via ALTER TABLE and the DBMS catalog table is not empty, the initial value in the CHECKSUM column of the DBMS catalog table is 0 and is subsequently updated with the result of a checksum calculation based on a one-time table scan (e.g., as part of a table reorg operation). In some embodiments, if the checksum calculation is disabled for a given user table, the CHECKSUM column of the DBMS catalog table is reset to NULL.

In operation, aspects of the present disclosure can be implemented as follows. First, for any participating table, the current checksum is stored in a new record in the corresponding DBMS catalog table and is updated as part of any successful completed DML operation on the participating table. Second, all DML workflows can be enhanced by the checksum calculation algorithm. This algorithm comprises the following steps: (i) calculation of a hash value of the corresponding table records via a standard hashing algorithm (e.g., MD5); (ii) calculation of the new table checksum using XOR operations of the current table checksum and all new record hashes calculated as part of a transaction; (iii) storing the newly calculated table checksum in the corresponding record of the DBMS catalog table.

The advantage of using an XOR operation in the table checksum calculation is that XOR operations are (i) commutative (e.g., it is not necessary to pre-order the input values for the calculation); (ii) self-inverse (e.g., enables removal of already processed record hash values from the overall checksum value, which is advantageous for updates and deletes), and (iii) it is a bitwise operation that is computationally fast and directly supported by a processor.

A table with checksum support can be initialized as follows. A new CHECKSUM keyword can be introduced, which can be used as an option when a table is created. For example:

CREATE TABLE <name>
(
[column-definitions]
) CHECKSUM;

Checksum support of an existing table can be enabled and/or disabled as follows. The ALTER TABLE command can be enhanced by the options: (i) CHECKSUM to enable the checksum calculation for the table (e.g., ALTER TABLE <name>CHECKSUM); and (ii) NO CHECKSUM to disable the checksum calculation for the table (e.g., ALTER TABLE <name>NO CHECKSUM). Enabling the CHECKSUM option on an existing table can be applied as part of a table reorganization operation (pending data definition changes).

Obtaining the checksum of a table in real-time can be implemented as follows. In some embodiments, Standard Structured Query Language (SQL) commands can be used since the checksum value is stored in a DBMS catalog table. For example, to select the current checksum of a user table, the DBMS catalog table that stores all user table details can be queried as follows:

SELECT checksum
FROM <DBMS catalog table>
WHERE table_name='<user table>';

Collectively, aspects of the present disclosure enable data administrators and/or users to verify data integrity and/or data consistency using the table checksums stored in the DBMS catalog table. Advantageously, the table checksums are commutative, self-inverse, and computationally lightweight by virtue of utilizing XOR operations to update the table checksums when the corresponding table is modified.

Referring now to the figures, FIG. 1 illustrates a block diagram of an example computational system 100 for DBMS table checksum management, in accordance with some embodiments of the present disclosure. Computational system 100 includes a first repository 102, DBMS 106, and second repository 120. The first repository 102, DBMS 106, and second repository 120 can be implemented using, for example, computers, tablets, smartphones, user devices, servers, mainframes, virtual machines (VMs), containers, and/or other hardware resources, virtualized hardware resources, and/or combinations thereof collectively useful for receiving, storing, processing, and/or transmitting data.

The first repository 102, DBMS 106, and second repository 120 can be communicatively coupled by a network 126. Network 126 can be a local area network (LAN), a wide area network (WAN), an intranet, the Internet, or any other network 126 or group of networks 126 capable of continuously, semi-continuously, or intermittently connecting (directly or indirectly) the first repository 102, DBMS 106, and second repository 120. In some embodiments, network 126 is consistent with WAN 1402 of FIG. 14.

First repository 102 includes user table T1 104-1 to user table TN 104-N (where N is any integer representing any number of user tables), collectively referred to as user tables 104. User tables 104 can represent any type of table now known or later developed, including, but not limited to, relational tables, non-relational tables, and the like.

Database Management System (DBMS) can be configured to manage database tables such as user tables 104. DBMS 106 can include DBMS catalog table 108, insert record workflow 112, delete record workflow 114, update record workflow 116, and drop partition workflow 118. The DBMS catalog table 108 can include table checksums 110. Table checksums 110 can be used to verify data consistency and/or data integrity of user tables 104 and/or transferred copy of user table 122. The insert record workflow 112, delete record workflow 114, update record workflow 116, and drop partition workflow 118 can be computer-executable code enabling the table checksums 110 to be updated for insert, delete, update, and drop partition operations on user tables 104.

The second repository 120 can include the transferred copy of user table 122. Transferred copy of user table 122 can be one of the user tables 104 that is transmitted to the second repository 120 as part of a data migration, data backup, or other data transfer protocol. Second repository 120 can utilize a verification workflow 124 that utilizes the table checksums 110 in DBMS catalog table 108 to verify a data consistency and/or data integrity of the transferred copy of user table 122.

As will be appreciated by one skilled in the art, the components of FIG. 1 can be reorganized in multiple configurations while remaining within the spirit and scope of the present disclosure. Additionally, components can be added, removed, and/or substituted relative to the components shown while remaining within the spirit and scope of the present disclosure. As one example, in some embodiments, the DBMS 106 can reside in either the first repository 102 or the second repository 120. As another example, the verification workflow 124 can reside in DBMS 106 rather than the second repository 120.

Figure 2:
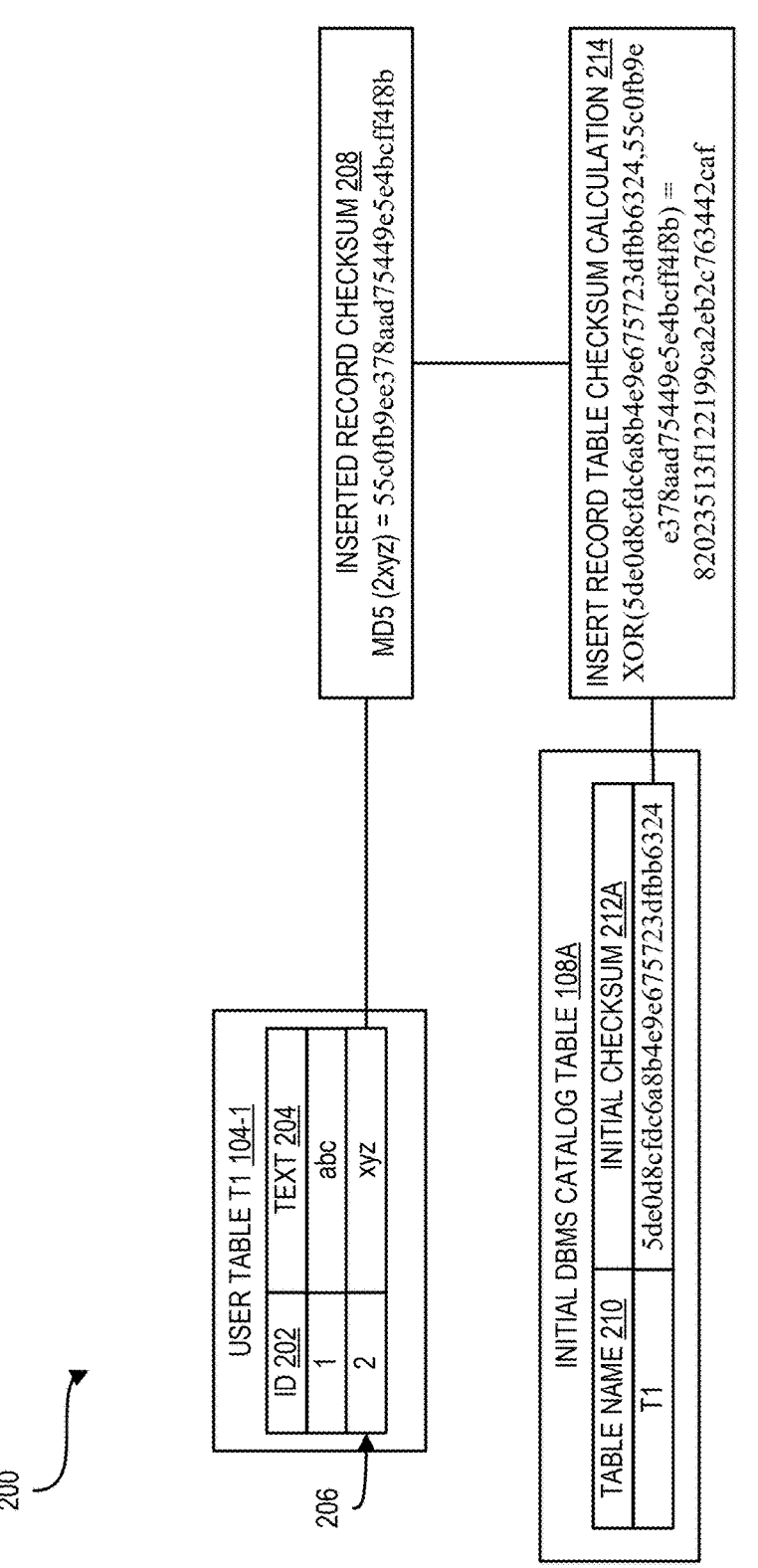
FIG. 2 illustrates a block diagram of an insert record workflow, in accordance with some embodiments of the present disclosure.

FIG. 2 illustrates a block diagram 200 of an insert record workflow 112, in accordance with some embodiments of the present disclosure. FIG. 2 includes user table T1 104-1 having a record ID 202 and TEXT 204. Specifically, FIG. 2 illustrates an inserted record 206. Aspects of the present disclosure determine an inserted record checksum 208 by determining a checksum of the inserted record 206. In some embodiments, the checksum is a hash. One example hash shown in FIG. 2 is an MD5 hash concatenating the record ID 202 with the TEXT 204 of the inserted record 206.

Although the term checksum is used throughout the present disclosure, any number of other similar mechanisms fall within the spirit and scope of the present disclosure, such as, for example, a digital fingerprint. Additionally, any discussion of a hash can refer to any type of hash, checksum, or other data fingerprinting technique, now known or later developed. Furthermore, here and elsewhere in the present disclosure, any discussion of a hash, checksum, and/or fingerprint can be derived from any portion of, or any combination of, data in a relevant record of a user table.

Referring back to FIG. 2, aspects of the present disclosure can update the DBMS catalog table 108 by retrieving, from the initial DBMS catalog table 108A (e.g., prior to the inserted record 206) an initial checksum 212A for the corresponding table name 210. Aspects of the present disclosure can then perform an insert record table checksum calculation 214 to determine an updated checksum for the DBMS catalog table 108. The insert record table checksum calculation 214 performs an XOR operation on the inserted record checksum 208 and the initial checksum 212A. The insert record table checksum calculation 214 can include converting the hashes of the inserted record checksum 208 and the initial checksum 212A to binary values, performing the XOR operation on the two binary values, and then converting the output back to an American Standard Code for Information Interchange (ASCII) representation.

The output of the insert record table checksum calculation 214 can then be stored as an updated checksum 212B in an updated DBMS catalog table 108B (e.g., after modifying user table T1 104-1 by applying the inserted record 206). The updated checksum 212B can be used to verify data consistency and/or data integrity of the user table T1 104-1 with the newly inserted record 206.

FIG. 3 illustrates a flowchart of an example method 300 for an insert record workflow 112, in accordance with some embodiments of the present disclosure. The method 300 can be performed by one or more components of FIG. 1 (e.g., first repository 102, second repository 120, DBMS 106, etc.), a computer, a processor, and/or another combination of hardware and/or software.

Operation 302 includes modifying the user table T1 104-1 by adding a newly inserted record 206 in a user table T1 104-1. Operation 304 includes calculating an inserted record checksum 208 of the newly inserted record 206. Operation 306 includes reading an initial checksum 212A from an initial DBMS catalog table 108A. Operation 308 includes performing an insert record table checksum calculation 214 using an XOR operation on binary representations of the initial checksum 212A and the inserted record checksum 208. Operation 308 further includes converting the output of the XOR operation into ASCII representation. Operation 310 includes storing the updated checksum 212B in the updated DBMS catalog table 108B resulting from the inserted record 206.

FIG. 4 illustrates a flowchart of a more detailed example method for an insert record workflow 112, in accordance with some embodiments of the present disclosure. The method 400 can be performed by one or more components of FIG. 1 (e.g., first repository 102, second repository 120, DBMS 106, etc.), a computer, a processor, and/or another combination of hardware and/or software.

Operation 402 includes inserting a record in a table. Operation 404 determines if the insert operation is successful. If not (404: NO), the method 400 proceeds to operation 406 and generates an error and then proceeds to operation 428 and ends the transaction. Referring back to operation 404, if the insert operation is successful (404: YES), the method 400 proceeds to operation 408.

Operation 408 determines if the checksum in a corresponding table partition and/or table is null. If so (408: YES), the method 400 proceeds to operation 428 and ends the transaction. If not (408: NO), the method 400 proceeds to operation 410 and reads a table partition checksum (related to the inserted record) and a table checksum from a DBMS catalog table. Operation 412 determines if the read operation is successful. If not (412: NO), the method 400 proceeds to operation 414 and generates a warning. The method 400 then proceeds to operation 428 and ends the transaction. Referring back to operation 412, if the read operation is successful (412: YES), the method 400 proceeds to operation 416 and calculates a record checksum (e.g., hash) associated with the inserted record. Operation 418 determines if the calculation is successful. If not (418: NO), the method 400 generates a warning in operation 414 and ends the transaction in operation 428. If operation 418 determines the calculation is successful (418: YES), the method 400 proceeds to operation 420 and calculates a new table partition checksum (related to the inserted record) and table checksum.

Operation 422 determines if the calculation is successful. If not (422: NO), the method 400 generates a warning in operation 414 and ends the transaction in operation 428. If so (422: YES), the method 400 proceeds to operation 424 and updates the DBMS catalog table with the new table partition checksum and table checksum calculated in operation 420. Operation 426 determines if the update is successful. If not (426: NO), the method 400 generates a warning in operation 414 and ends the transaction in operation 428. If so (426: YES), the method 400 successfully concludes the transaction in operation 428.

Figure 5:
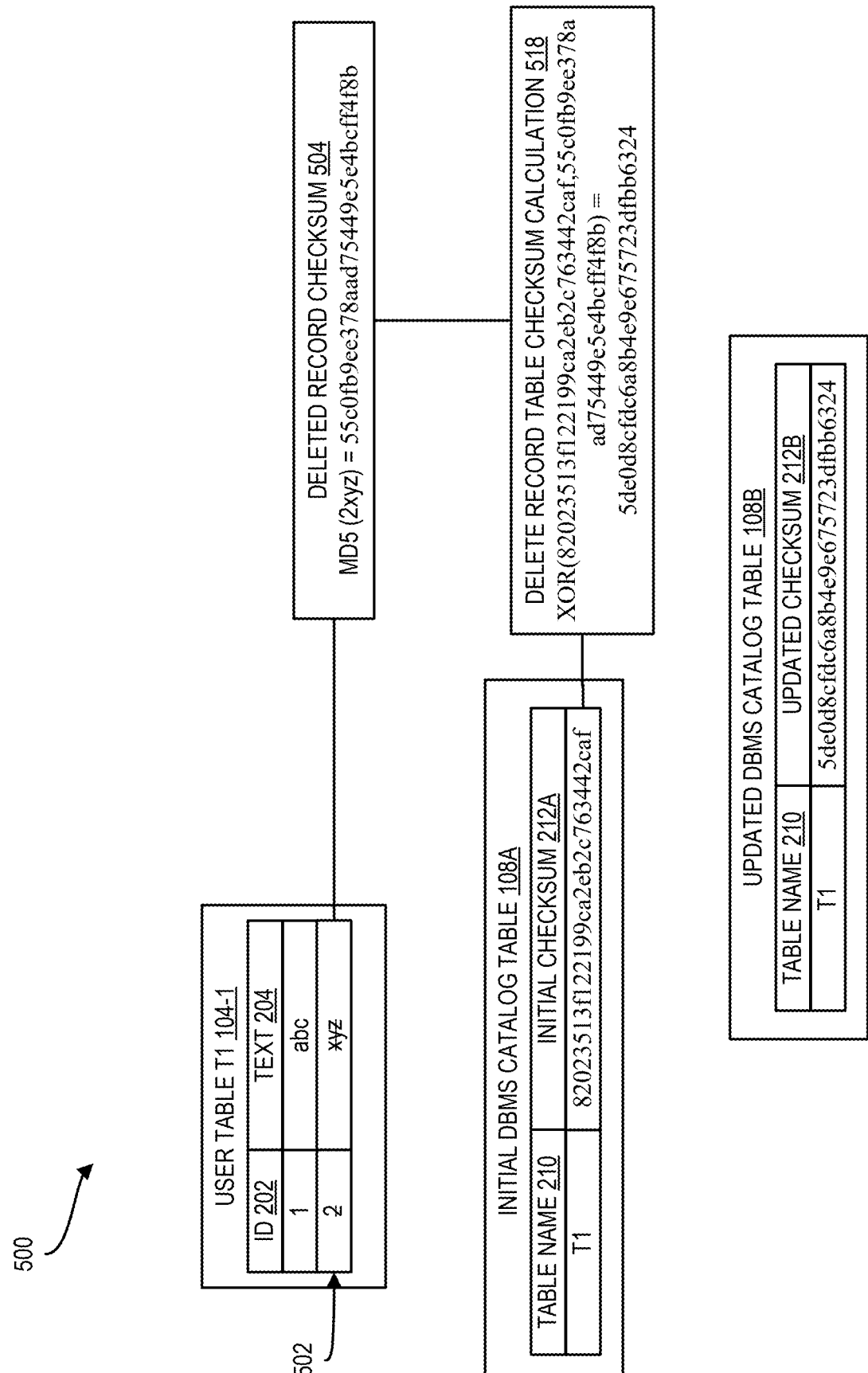
FIG. 5 illustrates a block diagram of a delete record workflow, in accordance with some embodiments of the present disclosure.

FIG. 5 illustrates a block diagram 500 of a delete record workflow 114, in accordance with some embodiments of the present disclosure. In the block diagram 500, a deleted record 502 is deleted from the user table T1 104-1. Aspects of the present disclosure calculate a deleted record checksum 504 (e.g., a hash) based on concatenating the ID 202 and TEXT 204 of the deleted record 502. Aspects of the present disclosure then perform a delete record table checksum calculation 518 by performing an XOR operation on the deleted record checksum 504 and an initial checksum 212A corresponding to the user table T1 104-1 and retrieved from an initial DBMS catalog table 108A. In some embodiments, the delete record table checksum calculation 518 first converts the deleted record checksum 504 and the initial checksum 212A to binary numbers, performs the XOR operation, and then converts the binary output of the XOR operation back to ASCII characters. Subsequently, the result of the delete record table checksum calculation 518 is recorded as an updated checksum 212B in an updated DBMS catalog table 108B.

FIG. 6 illustrates a flowchart of an example method 600 for a delete record workflow 114, in accordance with some embodiments of the present disclosure. The method 600 can be performed by one or more components of FIG. 1 (e.g., first repository 102, second repository 120, DBMS 106, etc.), a computer, a processor, and/or another combination of hardware and/or software.

Operation 602 includes calculating a deleted record checksum 504 of a deleted record 502 that is to be deleted from a user table T1 104-1. Operation 604 includes removing the deleted record 502 from the user table T1 104-1. Operation 606 includes reading an initial checksum 212A corresponding to the user table T1 104-1 from an initial DBMS catalog table 108A. Operation 608 includes calculating an updated checksum 212B based on an XOR operation on the deleted record checksum 504 and the initial checksum 212A corresponding to the user table T1 104-1 from the initial DBMS catalog table 108A. Operation 610 includes storing the updated checksum 212B in an updated DBMS catalog table 108B.

Figure 7:
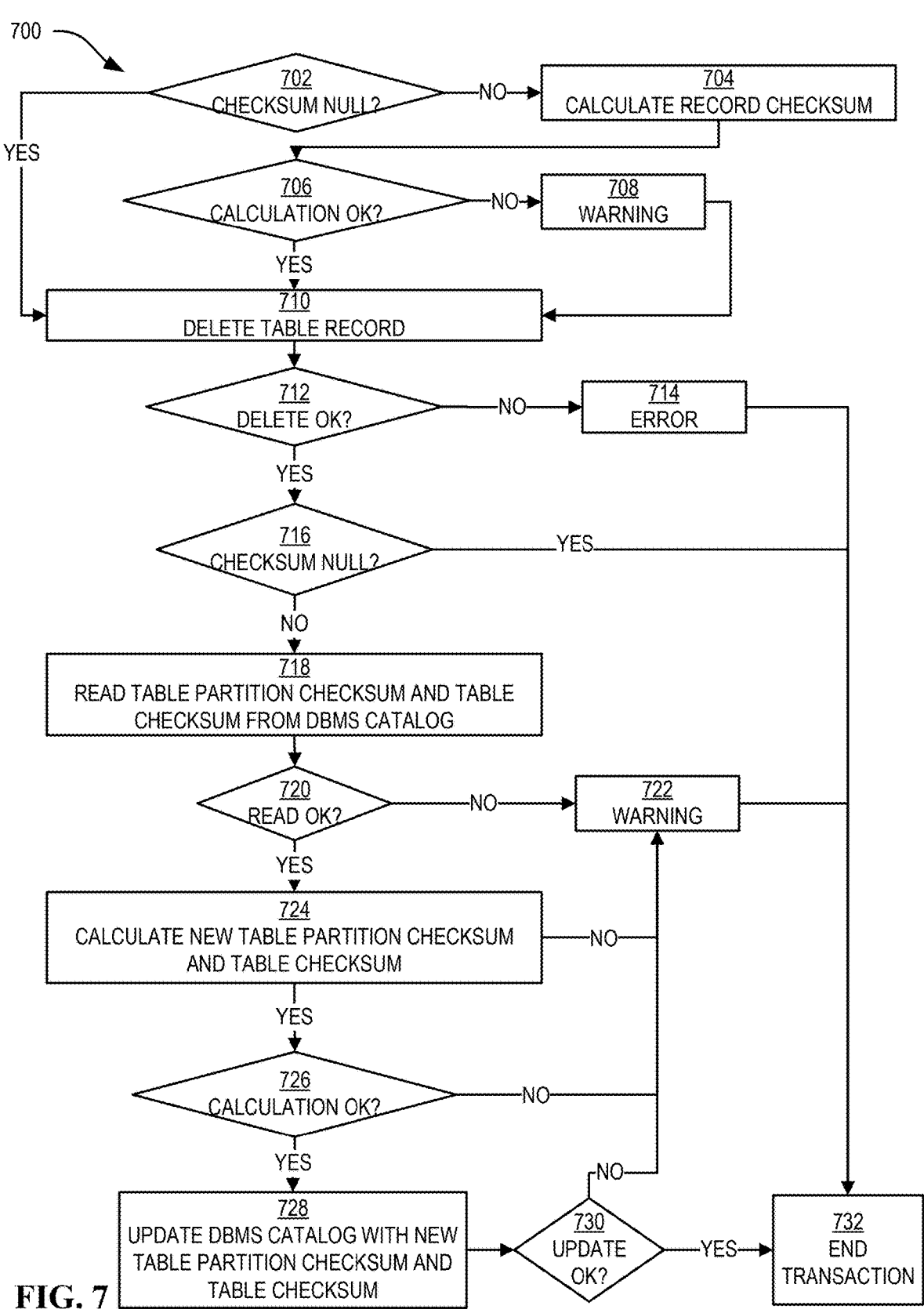
FIG. 7 illustrates a flowchart of a more detailed example method for a delete record workflow, in accordance with some embodiments of the present disclosure.

FIG. 7 illustrates a flowchart of a more detailed example method 700 for a delete record workflow 114, in accordance with some embodiments of the present disclosure. The method 700 can be performed by one or more components of FIG. 1 (e.g., first repository 102, second repository 120, DBMS 106, etc.), a computer, a processor, and/or another combination of hardware and/or software.

Operation 702 determines if the checksum corresponding to a deleted record is null. If not (702: NO), the method 700 proceeds to operation 704 and calculates a checksum of the record to be deleted. If so (702: YES), the method 700 proceeds to operation 710 and deletes the table record. Referring back to operation 704, after calculating the checksum of the record to be deleted, the method 700 proceeds to operation 706 and determines if the calculation is successful. If not (706: NO), the method 700 generates a warning in operation 708 and proceeds to delete the table record in operation 710. If so (706; YES), the method 700 proceeds to operation 710 and deletes the table record.

Following operation 710, the method 700 proceeds to operation 712 and determines if the delete is successful. If not (712: NO), the method 700 generates an error in operation 714 and ends the transaction in operation 732. If so (712: YES), the method 700 determines if a table partition checksum and/or table checksum related to the deleted record is null in operation 716. If so (716: YES), the method 700 proceeds to operation 732 and ends the transaction. If not (716: NO), the method 700 proceeds to operation 718 and reads a table partition checksum and a table checksum from a DBMS catalog. Operation 720 determines if the read is successful. If not (720: NO), the method 700 generates a warning in operation 722 and ends the transaction in operation 732. If so (720: YES), the method 700 proceeds to operation 724 and calculates a new table partition checksum and a new table checksum.

Operation 726 determines if the calculation is successful. If not (726: NO), the method 700 generates a warning in operation 722 and ends the transaction in operation 732. If so (726: YES), the method 700 updates the DBMS catalog with the new table partition checksum and the new table checksum in operation 728. Operation 730 determines if the update is successful. If not (730: NO), the method 700 generates a warning in operation 722 and ends the transaction in operation 732. If so (730: YES), the method 700 successfully concludes the transaction in operation 732.

Figure 8:
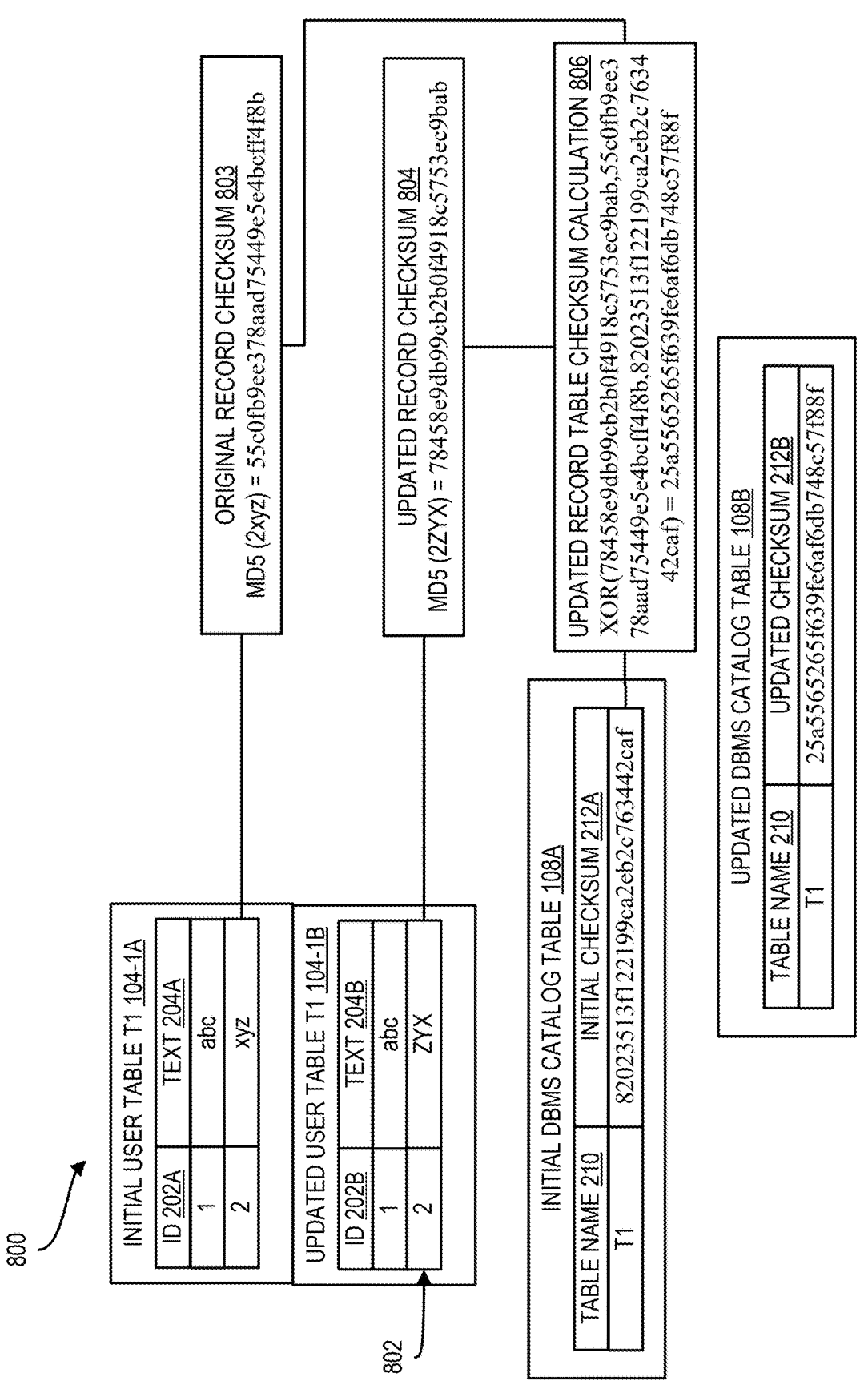
FIG. 8 illustrates a block diagram of an update record workflow, in accordance with some embodiments of the present disclosure.

FIG. 8 illustrates a block diagram 800 of an update record workflow 116, in accordance with some embodiments of the present disclosure. The block diagram 800 illustrates an initial user table T1 104-1A at a first time (including ID 202A and TEXT 204A) and an updated user table T1 104-1B at a second, subsequent time (including ID 202B and TEXT 204B), where the updated user table T1 104-1B includes an updated record 802 (where the updated record 802 can update the ID 202B and/or the TEXT 204B). The updated record 802 includes altered TEXT 204B relative to initial TEXT 204A. Aspects of the present disclosure are configured to calculate an original record checksum 803 for the initial (non-updated) record (in this example, the original record checksum 803 is equal to the inserted record checksum 208 discussed in FIG. 2). Additionally, aspects of the present disclosure calculate an updated record checksum 804 corresponding to the updated record 802.

Aspects of the present disclosure are configured to perform an updated record table checksum calculation 806 by performing an XOR operation on the original record checksum 803, the updated record checksum 804, and the initial checksum 212A from the initial DBMS catalog table 108A and corresponding to the initial user table T1 104-1A. In some embodiments, aspects of the present disclosure first convert the original record checksum 803, the updated record checksum 804, and the initial checksum 212A to binary format, perform the XOR operation, and convert the output of the XOR operation to ASCII format. The result of the updated record table checksum calculation 806 can then be stored as the updated checksum 212B in the updated DBMS catalog table 108B.

FIG. 9 illustrates a flowchart of an example method 900 for an update record workflow 116, in accordance with some embodiments of the present disclosure. The method 900 can be performed by one or more components of FIG. 1 (e.g., first repository 102, second repository 120, DBMS 106, etc.), a computer, a processor, and/or another combination of hardware and/or software.

Operation 902 calculates an original record checksum 803 in an initial user table T1 104-1A prior to an update. Operation 904 includes applying the update to generate an updated record 802 in an updated user table T1 104-1B. Operation 906 includes calculating an updated record checksum 804 of the updated record 802. Operation 908 includes reading an initial checksum 212A from an initial DBMS catalog table 108A. Operation 910 includes calculating an updated checksum 212B by applying an XOR operation to the original record checksum 803, the updated record checksum 804, and the initial checksum 212A of the initial user table T1 104-1A and retrieved from the initial DBMS catalog table 108A. Operation 912 includes storing the updated checksum 212B in an updated DBMS catalog table 108B.

Figure 10:
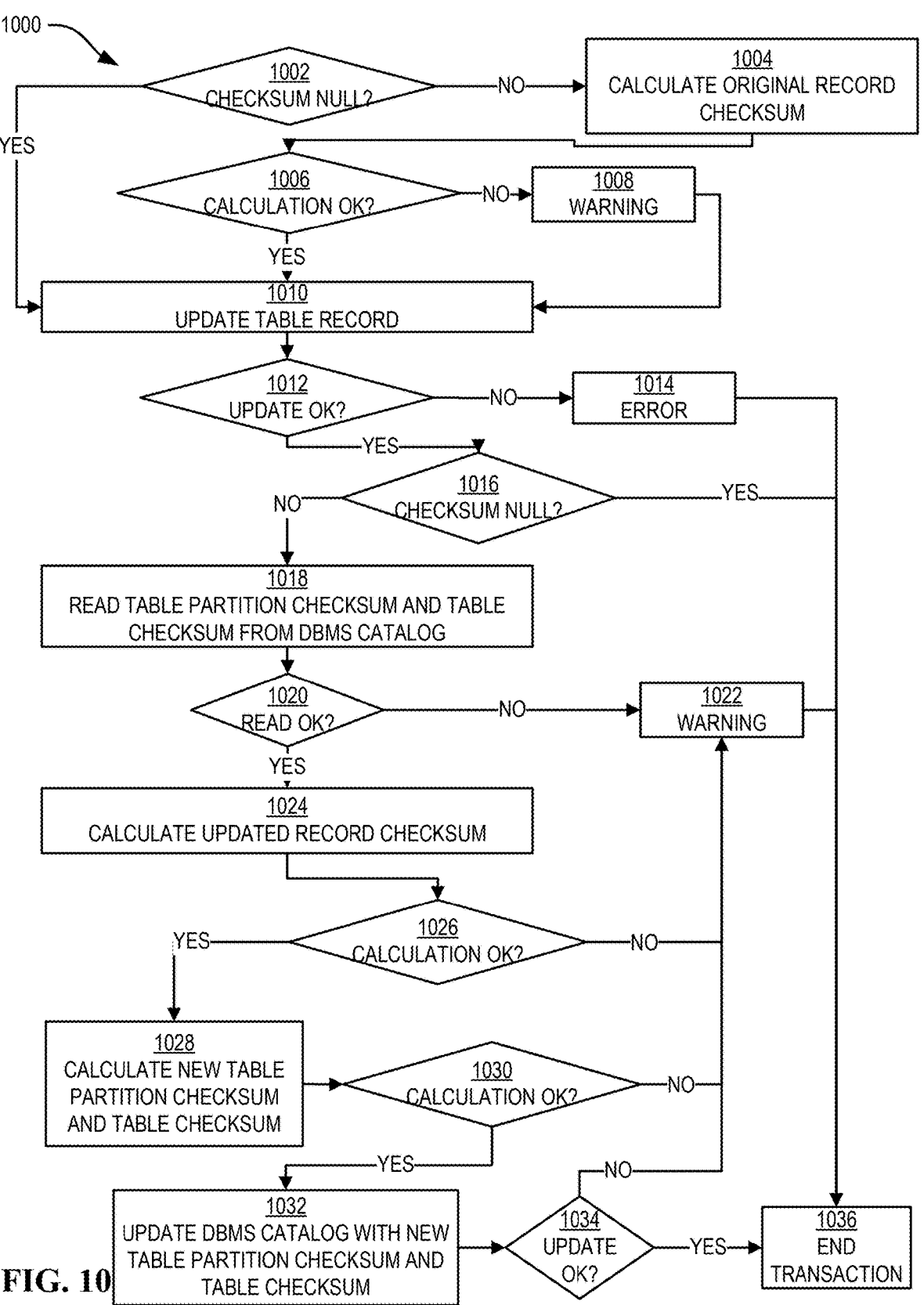
FIG. 10 illustrates a flowchart of a more detailed example method for an update record workflow, in accordance with some embodiments of the present disclosure.

FIG. 10 illustrates a flowchart of a more detailed example method 1000 for an update record workflow 116, in accordance with some embodiments of the present disclosure. The method 1000 can be performed by one or more components of FIG. 1 (e.g., first repository 102, second repository 120, DBMS 106, etc.), a computer, a processor, and/or another combination of hardware and/or software.

Operation 1002 determines if the checksum is null for the initial (non-updated) record. If so (1002: YES), the method 1000 proceeds to operation 1010 and updates the table record. If not (1002: NO), the method 1000 calculates the original record checksum in operation 1004. In operation 1006, the method 1000 determines if the calculation is successful. If not (1006: NO), the method 1000 generates a warning in operation 1008 and updates the table record in operation 1010. If so (1006: YES), the method 1000 updates the table record in operation 1010.

Operation 1012 determines if the update is successful. If not (1012: NO), the method 1000 generates an error in operation 1014 and ends the transaction in operation 1036. If so (1012: YES), the method 1000 determines if the checksum is null for the associated table and/or table partition in operation 1016. If so (1016: YES), the method 1000 ends the transaction in operation 1036. If not (1016: NO), the method 1000 proceeds to operation 1018. Operation 1018 includes reading a table partition checksum and a table checksum from a DBMS catalog. In operation 1020, the method 1000 determines if the read is successful. If not (1020: NO), the method 1000 generates a warning in operation 1022 and ends the transaction in operation 1036. If so (1020: YES), the method 1000 calculates an updated record checksum in operation 1024. Operation 1026 determines if the calculation is successful. If not (1026: NO), the method 1000 generates a warning in operation 1022 and ends the transaction in operation 1036. If so (1026: YES), the method calculates a new table partition checksum and table checksum in operation 1028. Operation 1030 determines if the calculation is successful. If not (1030: NO), the method 1000 generates a warning in operation 1022 and ends the transaction in operation 1036. If so (1030: YES), the method 1000 updates the DBMS catalog with the new table partition checksum and table checksum in operation 1032.

Operation 1034 determines if the update is successful. If not (1034: NO), the method 1000 generates a warning in operation 1022 and ends the transaction in operation 1036. If so (1034: YES), the method 1000 successfully ends the transaction in operation 1036.

Figure 11:
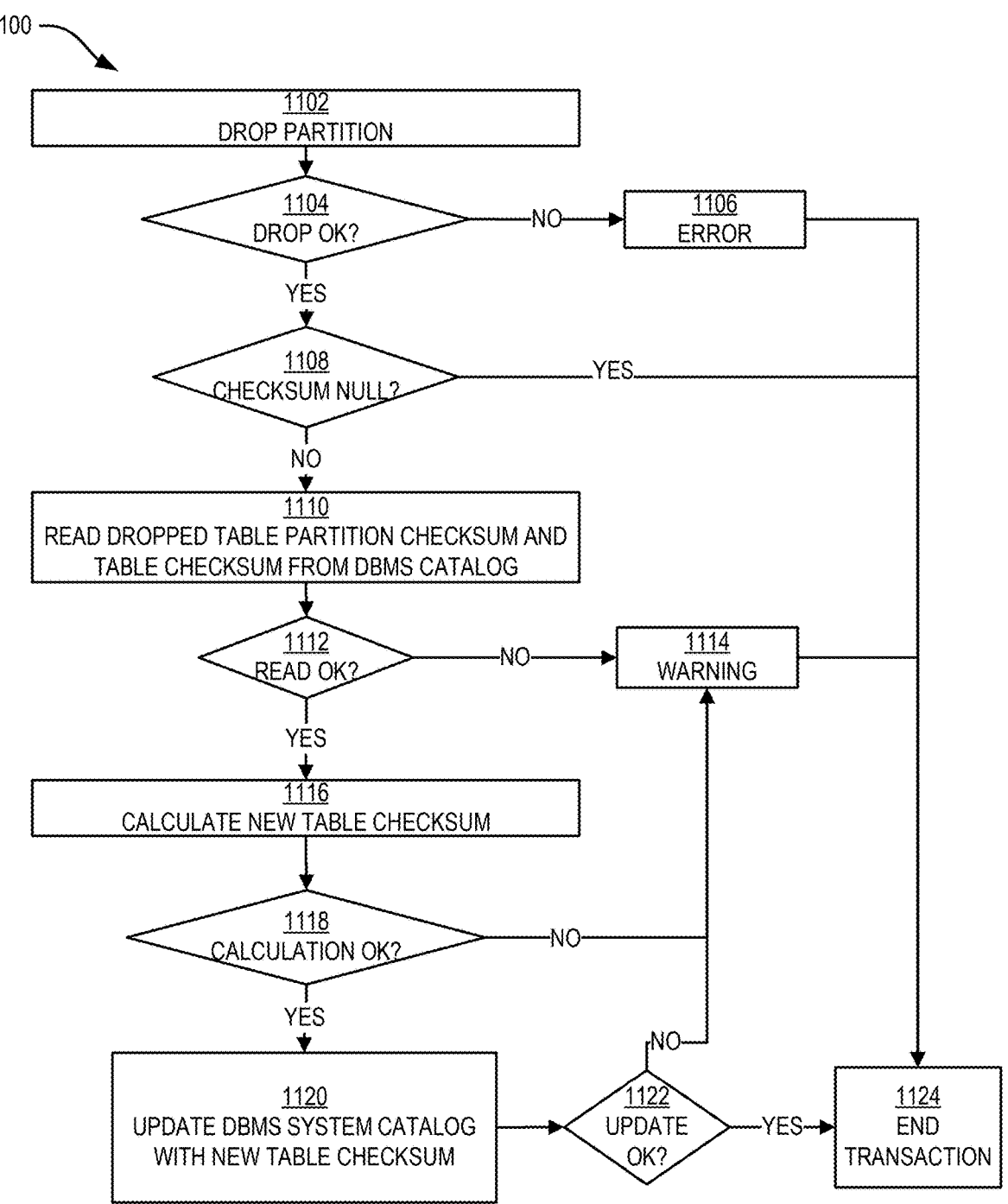
FIG. 11 illustrates a flowchart of an example method for a drop partition workflow, in accordance with some embodiments of the present disclosure.

FIG. 11 illustrates a flowchart of an example method 1100 for a drop partition workflow 118, in accordance with some embodiments of the present disclosure. The method 1100 can be performed by one or more components of FIG. 1 (e.g., first repository 102, second repository 120, DBMS 106, etc.), a computer, a processor, and/or another combination of hardware and/or software.

Operation 1102 includes dropping a table partition. Operation 1104 determines if the drop is successful. If not (1104: NO), the method 1100 generates an error in operation 1106 and ends the transaction in operation 1124. If so (1104: YES), the method 1100 determines if a checksum associated with the dropped partition is null in operation 1108. If so (1108: YES), the method 1100 proceeds to operation 1124 and ends the transaction. If not (1108: NO), the method 1100 proceeds to operation 1110 and reads the dropped table partition checksum and table checksum from a DBMS catalog. Operation 1112 determines if the read is successful. If not (1112: NO), the method 1100 generates a warning in operation 1114 and ends the transaction in operation 1124. If so (1112: YES), the method 1100 calculates a new table checksum in operation 1116. The new table checksum can account for the dropped partition. Operation 1118 determines if the calculation is successful. If not (1118: NO), the method 1100 generates a warning in operation 1114 and ends the transaction in operation 1124. If so (1118: YES), the method 1100 proceeds to operation 1120. Operation 1120 includes updating the DBMS catalog with the new table checksum. Operation 1122 determines if the update is successful. If not (1122: NO), the method 1100 can generate a warning in operation 1114 and can end the transaction in operation 1124. If so (1122: YES), the method 1100 can successfully end the transaction in operation 1124.

FIG. 12A illustrates a flowchart of an example method 1200 for DBMS table checksum management, in accordance with some embodiments of the present disclosure. The method 1200 can be performed by one or more components of FIG. 1 (e.g., first repository 102, second repository 120, DBMS 106, etc.), a computer, a processor, and/or another combination of hardware and/or software.

Operation 1202 includes generating a first checksum of a record in a user table. The first checksum can be generated upon inserting the record, deleting the record, or updating the record. In some embodiments, the first checksum is a hash of a value of the record that is inserted, deleted, or updated.

Operation 1204 includes storing an updated checksum in an entry corresponding to the user table in a DBMS catalog table. In some embodiments, the updated checksum is generated by combining the initial checksum with the first checksum using an Exclusive OR (XOR) operation. In other embodiments, the updated checksum is generated by combining the initial checksum, the first checksum, and a previous checksum associated with the record using an Exclusive OR (XOR) operation. When an initial checksum is used, the initial checksum in the entry corresponding to the user table in the DBMS catalog table can be based on a checksum calculation of a one-time table scan of the user table.

Operation 1206 includes verifying a data integrity of a transferred copy of the user table (or evaluating a data consistency of the updated version of the user table) using the updated checksum in the entry corresponding to the user table in the DBMS catalog table.

FIG. 12B illustrates a flowchart of an example method 1210 for verifying data consistency and/or data integrity using DBMS table checksum management (e.g., verification workflow 124), in accordance with some embodiments of the present disclosure. The method 1210 can be performed by one or more components of FIG. 1 (e.g., first repository 102, second repository 120, DBMS 106, etc.), a computer, a processor, and/or another combination of hardware and/or software.

Operation 1212 includes transferring a user table from a first repository to a second repository. The transfer can be part of a download, upload, migration, or other transfer of data tables. Operation 1214 includes calculating a table checksum on the user table in the second repository. In some embodiments, the table checksum is calculated in response to a table modification (e.g., insert, delete, update, etc.) made in the first repository and mirrored to the second repository. Operation 1216 can determine if the calculated table checksum of operation 1214 is equal to a recorded table checksum from the first repository. If not (1216: NO), the method 1200 can proceed to operation 1218 and can generate an indication of data corruption (or otherwise compromised data). If so (1216: YES), the method 1200 can proceed to operation 1220 and generate an indication of data consistency and/or data integrity.

FIG. 13 illustrates a flowchart of an example method 1300 for downloading, deploying, metering, and billing usage of DBMS table checksum code, in accordance with some embodiments of the present disclosure. The method 1300 can be performed by one or more components of FIG. 1 (e.g., first repository 102, second repository 120, DBMS 106, etc.), a computer, a processor, and/or another combination of hardware and/or software.

Operation 1302 includes downloading, from a remote data processing system and to one or more computers (e.g., first repository 102, second repository 120, DBMS 106 of FIG. 1 and/or computer 1401 of FIG. 14, etc.) DBMS table checksum code (e.g., DBMS table checksum code 1446 of FIG. 14). Operation 1304 includes executing the DBMS table checksum code. The executing can include performing any of the methods and/or functionalities discussed herein. Operation 1306 includes metering usage of the DBMS table checksum code. Usage can be metered by, for example, an amount of time the DBMS table checksum code is used, a number of servers, devices, and/or nodes deploying the DBMS table checksum code, an amount of resources consumed by implementing the DBMS table checksum code, a number of checksums calculated by the DBMS table checksum code, a size of the DBMS catalog table 108, and the like. Operation 1308 includes generating an invoice based on metering the usage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 14 illustrates a block diagram of an example computing environment, in accordance with some embodiments of the present disclosure. Computing environment 1400 contains an example of an environment for the execution of at least some of the computer code involved in performing the inventive methods, such as DBMS table checksum code 1446. In addition to DBMS table checksum code 1446, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1410 (including processing circuitry 1420 and cache 1421), communication fabric 1411, volatile memory 1412, persistent storage 1413 (including operating system 1422 and DBMS table checksum code 1446, as identified above), peripheral device set 1414 (including user interface (UI), device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

Computer 1401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method may be distributed among multiple computers and/or between multiple locations. On the other hand, in this presentation of computing environment 1400, detailed discussion is focused on a single computer, specifically computer 1401, to keep the presentation as simple as possible. Computer 1401 may be located in a cloud, even though it is not shown in a cloud in FIG. 14. On the other hand, computer 1401 is not required to be in a cloud except to any extent as may be affirmatively indicated.

Processor set 1410 includes one, or more, computer processors of any type now known or to be developed in the future. Processing circuitry 1420 may be distributed over multiple packages, for example, multiple, coordinated integrated circuit chips. Processing circuitry 1420 may implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set may be located "off chip." In some computing environments, processor set 1410 may be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods may be stored in DBMS table checksum code 1446 in persistent storage 1413.

Communication fabric 1411 is the signal conduction paths that allow the various components of computer 1401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1412 is any type of volatile memory now known or to be developed in the future. Examples include dynamic type random access memory (RAM) or static type RAM. Typically, the volatile memory is characterized by random access, but this is not required unless affirmatively indicated. In computer 1401, the volatile memory 1412 is located in a single package and is internal to computer 1401, but, alternatively or additionally, the volatile memory may be distributed over multiple packages and/or located externally with respect to computer 1401.

Persistent storage 1413 is any form of non-volatile storage for computers that is now known or to be developed in the future. The non-volatility of this storage means that the stored data is maintained regardless of whether power is being supplied to computer 1401 and/or directly to persistent storage 1413. Persistent storage 1413 may be a read only memory (ROM), but typically at least a portion of the persistent storage allows writing of data, deletion of data and re-writing of data. Some familiar forms of persistent storage include magnetic disks and solid state storage devices. Operating system 1422 may take several forms, such as various known proprietary operating systems or open source Portable Operating System Interface type operating systems that employ a kernel. The code included in DBMS table checksum code 1446 typically includes at least some of the computer code involved in performing the inventive methods.

Peripheral device set 1414 includes the set of peripheral devices of computer 1401. Data communication connections between the peripheral devices and the other components of computer 1401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1423 may include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 may be persistent and/or volatile. In some embodiments, storage 1424 may take the form of a quantum computing storage device for storing data in the form of qubits. In embodiments where computer 1401 is required to have a large amount of storage (for example, where computer 1401 locally stores and manages a large database) then this storage may be provided by peripheral storage devices designed for storing very large amounts of data, such as a storage area network (SAN) that is shared by multiple, geographically distributed computers. IoT sensor set 1425 is made up of sensors that can be used in Internet of Things applications. For example, one sensor may be a thermometer and another sensor may be a motion detector.

Network module 1415 is the collection of computer software, hardware, and firmware that allows computer 1401 to communicate with other computers through WAN 1402. Network module 1415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 1403 is any computer system that is used and controlled by an end user (for example, a customer of an enterprise that operates computer 1401), and may take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 may be a client device, such as thin client, heavy client, mainframe computer, desktop computer and so on.

Remote server 1404 is any computer system that serves at least some data and/or functionality to computer 1401. Remote server 1404 may be controlled and used by the same entity that operates computer 1401. Remote server 1404 represents the machine(s) that collect and store helpful and useful data for use by other computers, such as computer

1401. For example, in a hypothetical case where computer 1401 is designed and programmed to provide a recommendation based on historical data, then this historical data may be provided to computer 1401 from remote database 1430 of remote server 1404.

Public cloud 1405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405. The virtual computing environments (VCEs) typically take the form of virtual machines from virtual machine set 1443 and/or containers from container set 1444. It is understood that these VCEs may be stored as images and may be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware, and firmware that allows public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1406 is similar to public cloud 1405, except that the computing resources are only available for use by a single enterprise. While private cloud 1406 is depicted as being in communication with WAN 1402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1405 and private cloud 1406 are both part of a larger hybrid cloud.

Cloud computing services and/or microservices (not separately shown in FIG. 14): private clouds 1406 and public clouds 1405 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

Some example embodiments will now be described. Clause 1 is a computer-implemented method. The computer-implemented method includes generating a first checksum of a record in a user table; storing an updated checksum in an entry corresponding to the user table in a DBMS catalog table, wherein the updated checksum is based on the first checksum and an initial checksum in the entry corresponding to the user table in the DBMS catalog table; and verifying a data integrity of a transferred copy of the user table using the updated checksum in the entry corresponding to the user table in the DBMS catalog table.

Clause 2 includes the features of clause 1. In this example, the updated checksum is generated by combining the initial checksum with the first checksum using an Exclusive OR (XOR) operation. Optionally, the first checksum is generated upon inserting the record. As another option, the first checksum is generated upon deleting the record.

Clause 3 includes the features of clause 1. In this example, the updated checksum is generated by combining the initial checksum, the first checksum, and a previous checksum associated with the record using an Exclusive OR (XOR) operation. Optionally, the first checksum is generated upon updating the record.

Clause 4 includes the features of any one of clauses 1 to 3. In this example, the first checksum is determined using a hash function.

Clause 5 includes the features of any one of clauses 1 to 4. In this example, the initial checksum in the entry corresponding to the user table in the DBMS catalog table is based on a checksum calculation of a one-time table scan.

Clause 6 includes the features of any one of clauses 1 to 5. In this example, the computer-implemented method is executed by a computational system based on DBMS table checksum code downloaded to the computational system from a remote data processing system. Optionally, the computer-implemented method further comprises: metering usage of the DBMS table checksum code; and generating an invoice based on metering the usage of the DBMS table checksum code.

Clause 7 is a system comprising one or more processors and one or more computer-readable storage media storing program instructions which, when executed by the one or more processors, are configured to cause the one or more processors to perform a method according to any one of clauses 1 to 6.

Clause 8 is a computer program product comprising one or more computer readable storage media, and program instructions collectively stored on the one or more computer readable storage media, the program instructions comprising instructions configured to cause one or more processors to perform a method according to any one of clauses 1 to 6.

What is claimed is:

1. A computer-implemented method comprising:

generating a first checksum of a record in a user table stored in a first repository;

storing an updated checksum in an entry corresponding to the user table in a Database Management System (DBMS) catalog table, wherein the updated checksum is based on the first checksum and an initial checksum in the entry corresponding to the user table in the DBMS catalog table, wherein the updated checksum is generated by combining the initial checksum with the first checksum using an Exclusive OR (XOR) operation; and verifying a data integrity of a transferred copy of the user table using the updated checksum in the entry corresponding to the user table in the DBMS catalog table, wherein the transferred copy of the user table is transferred to a second data repository as part of a data migration protocol.

2. The computer-implemented method of claim 1, wherein the first checksum is generated upon inserting the record.

3. The computer-implemented method of claim 1, wherein the first checksum is generated upon deleting the record.

4. The computer-implemented method of claim 1, wherein the updated checksum is generated by combining the initial checksum, the first checksum, and a previous checksum associated with the record using the Exclusive OR (XOR) operation.

5. The computer-implemented method of claim 4, wherein the first checksum is generated upon updating the record.

6. The computer-implemented method of claim 1, wherein the first checksum is determined using a hash function.

7. The computer-implemented method of claim 1, wherein the initial checksum in the entry corresponding to the user table in the DBMS catalog table is based on a checksum calculation of a one-time table scan.

8. The computer-implemented method of claim 1, wherein the computer-implemented method is executed by a computational system based on DBMS table checksum code downloaded to the computational system from a remote data processing system.

9. The computer-implemented method of claim 8, wherein the computer-implemented method further comprises:

metering usage of the DBMS table checksum code; and generating an invoice based on metering the usage of the DBMS table checksum code.

10. The computer-implemented method of claim 1, wherein the updated checksum is further generated by:

converting the first checksum and the initial checksum to a first binary value and a second binary value;

performing the XOR operation on the first binary value and the second binary value to generate an output; and converting the output to an American Standard Code for Information Interchange (ASCII) representation.

11. A system comprising:

one or more processors; and one or more computer-readable storage media storing program instructions which, when executed by the one or more processors, are configured to cause the one or more processors to perform a method comprising:

generating a first checksum of a record in a user table stored in a first repository;

storing an updated checksum in an entry corresponding to the user table in a Database Management System (DBMS) catalog table, wherein the updated checksum is based on the first checksum and an initial checksum in the entry corresponding to the user table in the DBMS catalog table, wherein the updated checksum is generated by combining the initial checksum with the first checksum using an Exclusive OR (XOR) operation; and verifying a data integrity of a transferred copy of the user table using the updated checksum in the entry corresponding to the user table in the DBMS catalog table, wherein the transferred copy of the user table is transferred to a second data repository as part of a data migration protocol.

12. The system of claim 11, wherein the first checksum is generated upon inserting the record.

13. The system of claim 11, wherein the first checksum is generated upon deleting the record.

14. The system of claim 11, wherein the updated checksum is generated by combining the initial checksum, the first checksum, and a previous checksum associated with the record using the Exclusive OR (XOR) operation.

15. The system of claim 11, wherein the updated checksum is further generated by:

converting the first checksum and the initial checksum to a first binary value and a second binary value;

performing the XOR operation on the first binary value and the second binary value to generate an output; and converting the output to an American Standard Code for Information Interchange (ASCII) representation.

16. A computer program product comprising one or more computer readable storage media, and program instructions collectively stored on the one or more computer readable storage media, the program instructions comprising instructions configured to cause one or more processors to perform a method comprising:

generating a first checksum of a record in a user table stored in a first repository;

storing an updated checksum in an entry corresponding to the user table in a Database Management System (DBMS) catalog table, wherein the updated checksum is based on the first checksum and an initial checksum in the entry corresponding to the user table in the DBMS catalog table, wherein the updated checksum is generated by combining the initial checksum with the first checksum using an Exclusive OR (XOR) operation; and verifying a data integrity of a transferred copy of the user table using the updated checksum in the entry corresponding to the user table in the DBMS catalog table, wherein the transferred copy of the user table is transferred to a second data repository as part of a data migration protocol.

17. The computer program product of claim 16, wherein the first checksum is generated upon inserting the record.

18. The computer program product of claim 16, wherein the first checksum is generated upon deleting the record.

19. The computer program product of claim 16, wherein the updated checksum is generated by combining the initial checksum, the first checksum, and a previous checksum associated with the record using the Exclusive OR (XOR) operation.

20. The computer program product of claim 16, wherein the updated checksum is further generated by:

converting the first checksum and the initial checksum to a first binary value and a second binary value;

performing the XOR operation on the first binary value and the second binary value to generate an output; and converting the output to an American Standard Code for Information Interchange (ASCII) representation.

\* \* \* \* \*